United States Patent [19]

Baker

[11] 4,127,684
[45] Nov. 28, 1978

[54] CRACK PROTECTION METHOD
[75] Inventor: Robert R. Baker, Livonia, Mich.
[73] Assignee: Ford Motor Company, Dearborn, Mich.
[21] Appl. No.: 863,990
[22] Filed: Dec. 23, 1977
[51] Int. Cl.$^2$ .............................................. C04B 35/58
[52] U.S. Cl. .................................. 427/287; 264/134; 264/320; 264/338
[58] Field of Search ............... 264/320, 325, 332, 338, 264/134; 156/89; 427/370, 287

[56] References Cited
FOREIGN PATENT DOCUMENTS
1,454,929  11/1976  United Kingdom ...................... 264/86

Primary Examiner—Robert F. White
Assistant Examiner—John A. Parrish
Attorney, Agent, or Firm—William E. Johnson; Keith L. Zerschling

[57] ABSTRACT

This invention is directed to a process for preventing the cracking of ceramic bodies during a hot pressing operation. The method is accomplished by applying a relatively thin layer of a release material to surfaces of the ceramic body which are to be load reaction surfaces during the hot pressing operation. A relatively thick layer of the release material is applied to surfaces of the ceramic body which are not to be load reaction surfaces during the hot pressing operation.

4 Claims, 4 Drawing Figures

CRACK PROTECTION METHOD

The invention herein described was made in the course of or under a contract or subcontract with the Department of the Army.

PRIOR ART STATEMENT AND BACKGROUND OF THE INVENTION

The most pertinent prior art the applicant and his attorney are aware of is that which is to be described hereinbelow.

My associates have been making duo density rotors of silicon nitride in the following manner. A rotor blade ring is formed, for example, in a slip casting operation. This blade ring has an annular ring portion with a plurality of complex shaped blade surfaces projecting outwardly therefrom. The blade ring is formed by slip casting silicon particles into a mold suitable for forming the complex shape desired. The vehicle of the slip is withdrawn through surfaces of the mold as is well known in the art to leave behind a consolidated mass of silicon particles in the shape of a blade ring. This blade ring is subsequently subjected to a nitriding operation in which the silicon particles are converted to silicon nitride. All but an interior annular surface of the silicon nitride article is subsequently encapsulated with additional material which is transformed into silicon nitride to form a ring shaped unit. The article is encapsulated so that it can withstand the temperatures and pressures of a hot press bonding operation in which a central hub is simultaneously formed and bonded to an interior annular surface of the blade ring.

The general process previously used for carrying out this operation is disclosed in U.S. patent application Ser. No. 571,897, filed Apr. 25, 1975, for a Method of Forming a Duo Density Silicon Nitride Article, which application is now abandoned. This application was assigned to the same assignee as this application and is hereby incorporated by reference.

The cited application teaches that the blade ring should be treated with a release material prior to having the same encapsulated. The purpose of the release material is to permit easy removal of the encapsulating material after the hot press bonding operation. The application cited teaches that a uniform thin layer of a release material such as boron nitride should be applied to all surfaces of the blade ring which are to be encapsulated.

I have found that the placement of a uniform coating of a release material is not the best procedure for obtaining a finished article. When I follow the procedure described in the above noted patent application, I often obtain finished articles in which cracks were found in the blades and ring portion thereof.

In conducting further work in order to develop a process for producing a crack-free article, I discovered that a relatively thin layer of release material should be applied to those surfaces of the ceramic body which are to be a load reaction surface of the body during a hot pressing operation. By a load reaction surface, I mean a surface upon which reaction forces will be developed because of the direct application of a force on another surface during the hot pressing operation. All other surfaces should have a relatively thick coating of the release material thereon.

SUMMARY OF THE INVENTION

This invention relates to a method of protecting a ceramic body from cracking and, more particularly, to a method of protecting such a ceramic body from cracking during a hot pressing operation in which pressure is applied to the body.

In accordance with the teachings of the method of this invention, a method of protecting a ceramic body from cracking during a hot pressing operation is as follows. Generally, the ceramic body has a portion thereof of complex shape defined by surfaces extending in different directions. The complex shaped portion of the body is supported by an encapsulating medium during the hot pressing operation. In accordance with the teachings of this method, a relatively thin layer of a release material is applied to the surfaces of the ceramic body which are to be load reaction surfaces during the hot pressing operation. The release material is a material which is non-reactive with the ceramic of the ceramic body and the encapsulating medium at the temperatures and pressures encountered in the hot pressing operation. A relatively thick layer of the release material is applied to the surfaces of the ceramic body which are not load reaction surfaces during the hot pressing operation.

In accordance with the teachings of a preferred embodiment of this invention, the release material is finely divided boron nitride. When the release material is boron nitride, a coating of 0.001–0.003 inches is considered a thin coat, while a coating of 0.005–0.010 inches is considered a thick coat.

I have witnessed that when a release material is applied to the article in accordance with the teachings of the method of this invention, a substantial reduction is achieved in the scrappage of manufactured articles which occurs because such articles are cracked during the hot pressing operation. When the release material was applied uniformly over the entire body, as taught in the patent application previously mentioned, approximately nine out of every ten bodies manufactured had to be discarded because of a cracking problem. However, since the development of the method of this invention, only three in ten manufactured articles have cracks therein.

DESCRIPTION OF THE PREFERRED EMBODIMENT

Figure 1:
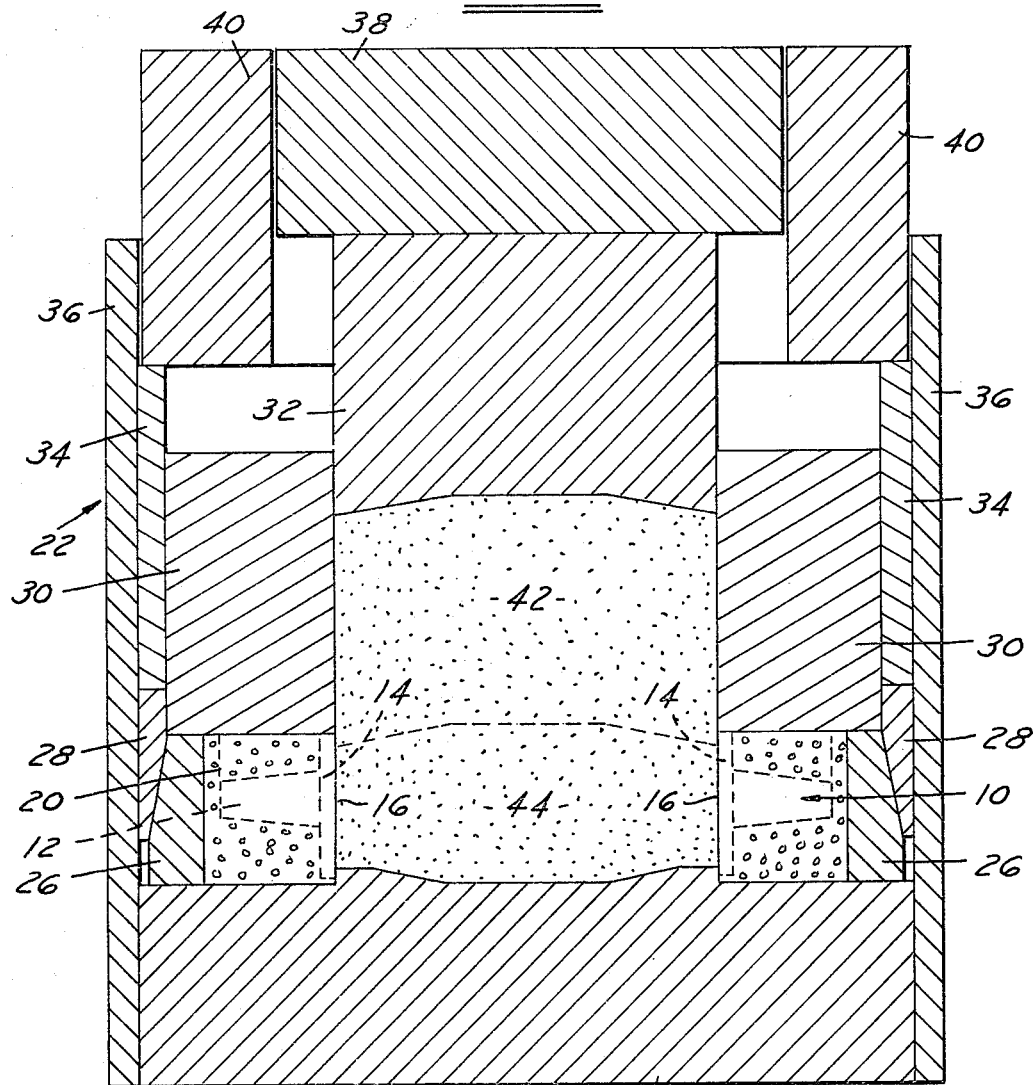
FIG. 1 is a schematic drawing in cross section showing apparatus in which the method of this invention can be performed.

A method of protecting a ceramic body from cracking during a hot pressing operation will be described. In this preferred embodiment, the ceramic body to be protected will be a duo density rotor of silicon nitride. The rotor is formed of two elements of different density. The first element of the rotor is its outer blade ring of complex shape.

The first element may be formed by a slip casting technique. In this technique, silicon particles suspended in a vehicle are cast into a mold having the shape desired for the blade ring. The mold is formed at least in part by a porous material capable of drawing the vehicle of the slip thereby leaving behind a consolidated mass of silicon particles. Such a process is known to those skilled in the art.

After the silicon particles are formed into the blade ring desired, the so-formed first element is thereafter nitrided in order to produce a body of silicon nitride.

Since the first element is formed of silicon particles, the nitriding operation is effective to change the first element into silicon nitride. In the nitriding operation, the element is heated while exposed to nitrogen gas at a temperature and for a sufficient period of time that all of the silicon is transformed into silicon nitride. A full procedure for nitriding silicon to form silicon nitride is disclosed in U.S. patent application Ser. No. 411,599, filed Oct. 30, 1973 and entitled "Improved Process for Making Silicon Nitride Articles," which application, now abandoned, is assigned to the same assignee as this application. This prior application is hereby incorporated by reference. An article of silicon nitride made by a slip casting technique will have a final density in the range of 80 to 85% of theoretical. Upon completion of the nitriding step, the finished first element is a blade ring generally identified by the numeral 10 (FIG. 2) having a plurality of blades 12 thereon attached to a support portion 14. The support portion 14 also defines an inwardly facing bonding surface 16, best seen in FIG. 1. The blades 12 shown in the drawings are very simple in design for the purpose of illustrating the invention. In an actual turbine structure, these blades have very complex curved surfaces having geometry dictated by the size of the turbine and the amount of gasses flowing therethrough.

Figure 3:
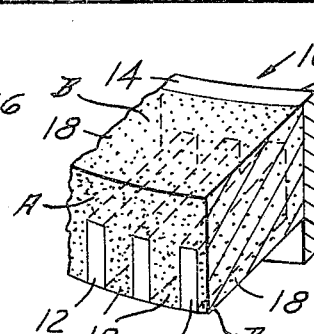
Figure 4:
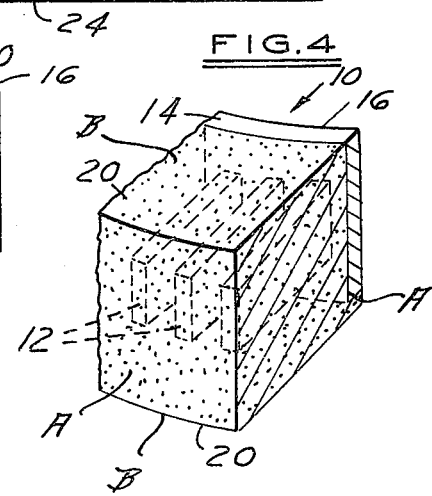

This invention teaches a method of protecting the blade ring 10 from being cracked during a hot pressing operation in which a second element is simultaneously formed and bonded to the blade ring. This second element is a hub which serves as a support for the blade ring 10. In order to carry out the process which simultaneously forms and bonds the second element or hub to the first element or blade ring 10, it is necessary to encapsulate the blade ring so that it is capable of withstanding the pressures encountered in a hot press forming and bonding operation. The general manner in which the encapsulating operation is carried out is illustrated in FIGS. 3 and 4.

Prior to encapsulating the blade ring 10, the method of my invention is practiced on the blade ring so that it is protected and generally is not cracked during the hot press bonding operation. In accordance with the teachings of the method of my invention, and in accordance with the application of those teachings to this preferred embodiment, a release material is applied to the blade ring 10. The release material is one which should be non-reactive with the ceramic body and the encapsulating medium to be used. In this case, since the ceramic body is formed of silicon nitride and the encapsulating medium will be the same material, boron nitride is selected as the release material. However, other release materials are boron carbide, titanium carbide and titanium oxide.

The selected release material is applied in a relatively thin layer to those surfaces of the ceramic body which are to be load reaction surfaces during the hot pressing operation. For example, the release material may be applied by brushing on a solution of boron nitride in a suitable carrier such as methyl ethyl keytone. By load reaction surfaces, I mean those surfaces to which a load is applied and a reaction is developed to that applied load. In the case of the blade ring 10, the load reaction surfaces are identified in FIG. 2 by the capital letter A. Similarly, load reaction surfaces of the partially encapsulated and fully encapsulated blade ring 10 are identified in FIGS. 3 and 4 by the capital letter A. In accordance with the teachings of the preferred embodiment wherein boron nitride is the selected release material, the relatively thin coating has a thickness in the range of 0.001–0.003 inches. In a subsequent portion of the specification, I will point out exactly why these surfaces identified by the capital letter A are load reaction surfaces.

Non-load reaction surfaces are coated with a relatively thick layer of the release material. In the situation where boron nitride is used on a silicon nitride article, a relatively thick coating is in the range from 0.005–0.010 inches. Non-load reaction surfaces are identified by the capital letter B in the drawings.

The blade ring 10 may be encapsulated in the following manner. All of the load reaction surfaces are coated with a relatively thin layer of the release material and all non-load reaction surfaces are coated with a relatively thick layer of the release material. The blade ring is then placed in a mold which closes off the volume between each of the individual blades 12 thereby defining a plurality of cavities. A casting slip of silicon particles is applied to each of the cavities to build up slip cast silicon particles. After a buildup of particles between the blades is completed, the release material is applied thereover and the casting operation is continued so that each of the individual portions between individual blades have a central member formed thereover. This resultant product is best illustrated in FIG. 3 where the individual blade 12 are shown as having silicon particles built up therebetween and thereover to form a first portion 18 of an encapsulating member. As illustrated in FIG. 3, surface A will be a load reaction surface, and upper and lower surfaces B will be non-load reaction surfaces. The load reaction surfaces have a relatively thin layer of release material applied thereto, and the non-load reaction surfaces have a relatively thick layer of the release material applied thereto.

Figure 2:
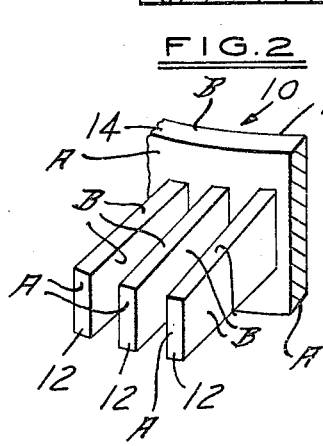
FIGS. 2, 3 and 4 illustrate graphically the manner in which a ceramic body may be encapsulated.

After the first portion 18 of the encapsulating member has been placed about the blades 12, the article is coated with boron nitride as discussed above. The article is then placed in a second forming mold and a silicon slip is cast around the entire volume of the blade ring 10 with the exception of the bonding surface 16. After the slip casting operation, a second portion 20 of the encapsulating member is defined. As shown in FIG. 4, a relatively thin layer of release material is applied to load reaction surfaces indicated by the capital letter A and a relatively thick layer of release material is applied to the non-load reaction surface designated by the capital letter B. The first portion and second portion of the encapsulating member are then nitrided simultaneously in a nitriding operation thereby transforming the material from silicon into silicon nitride. The now-encapsulated blade ring 10 is now in a configuration so as to be receivable in a pressing die structure shown in FIG. 1. In some cases, a small amount of machining may be required to size the encapsulated blade ring for the pressing die structure. The pressing die structure shown in FIG. 1 is one which is insertable into a heatable chamber. The structure is also one which may be fitted between upper and lower die members so that the die members may assert pressures thereon while the entire structure and materials contained therein are heated to the appropriate temperatures.

The pressing die structure generally identified by the numeral 22 includes a contoured bottom graphite piston 24, a plurality of tapered graphite inside wedges 26—26, a tapered graphite outer wedge 28, a graphite restraining sleeve 30, a contoured top graphite piston 32, an outside graphite piston 34 for applying pressure to the tapered graphite outside wedge 28, an outside graphite sleeve 36, an inside ram 38 and an outside ram 40.

After the blade ring 10 has been encapsulated with the first portion 18 and the second portion 20 of the encapsulating material and the material is nitrided, it is placed on the contoured bottom graphite piston 24 as shown in FIG. 1. At that time, the various members are positioned about the body as shown in the drawing. A measured volume of silicon nitride powder is poured into the volume defined between the surfaces of the contoured bottom graphite piston 24, the bonding surface 16 and the graphite restraining sleeve 30. The contoured top graphite piston 32 is then placed into the graphite restraining sleeve and heat and pressure are applied to the material in the defined volume.

The powder used in the pressing operation is a mixture consisting of from about 94 to 99.5% by weight of a silicon nitride particles, and from about 6.0 to 0.5% by weight of a densification aid. In accordance with the teachings of the preferred embodiment, the silicon nitride used in the compacting operation is alpha silicon nitride powder.

As stated above, silicon nitride powder 42 is placed in the volume defined between the various die members in order to initiate a pressing operation. A measured amount of material is placed therein so as to produce a final article of a particular size. The material will be hot pressed to form a second element which in this case of the preferred embodiment is a hub 44 for the blade ring 10. The hub will be formed and simultaneously bonded to the blade ring during this processing. A barrier material can be coated on the graphite die system to minimize any reaction between the silicon nitride powder and the die system. Barrier materials commonly used are graphite foil and boron nitride. The materials would be placed on all the surfaces of the interior volume of the pressing die structure except the bonding surface 16 of the blade ring 10.

During the pressing operation, the inside ram 38 moves downwardly as viewed in FIG. 1 to compact the silicon nitride powder 42 to form the hub 44. during the pressing and formation of the member 44, the pressure forming the hub will cause a radially outwardly directed force to be applied on the inwardly facing bonding surface 16 of the ring 10. This force is resisted by application of a pressure from the outside ram 40 onto the outside graphite piston 34 which in turn acts on the tapered graphite outer wedge 28 which in turn applies a pressure on the tapered graphite inside wedge 26 which in turn apply a radially inwardly directed force to counterbalance the force being applied radially outwardly on the inwardly facing bonding surface 16. It should be noted that the radially inwardly directed forces being applied by the tapered graphite inside wedges 26 is generally directed perpendicularly to the surfaces which have been designated as A surfaces in FIGS. 2, 3 and 4. These surfaces have been designated as being the load reaction surfaces. It is now understood what is meant by load reaction surfaces.

The bottom surface of the support portion 14 of the blade ring 10 as shown in FIG. 4 is also designated as a load reaction surface. This is so designated because the graphite restraining sleeve 30 through the drag of the contoured top graphite piston 32 moving therewithin and the outer graphite piston 34 will apply a force on the upper surface of the encapsulated blade ring 10 which is resisted along the bottom edge of the encapsulated blade ring through the stability of the bottom graphite piston 24. A downwardly directed force is also generated from the silicon nitride particles being hot pressed in the center of the blade ring. The thin coats of the release material are placed on the load reaction surfaces so that no substantial movement can take place with respect to the relative position of the surfaces while pressure and heat are being applied. The other surfaces have a thick layer of material applied thereto so that a relative movement may take place with respect to that surface and its surrounding encapsulant. Such action results in the significant elimination of cracking.

The silicon nitride material 42 is hot pressed at a temperature in a range from about 1650° C. to about 1800° C. and at a pressure from about 1000 psi to about 4000 psi. The heating of the material is accomplished by an induction heating unit not shown. The pressure, of course, is applied by applying compressive force on the contoured bottom piston 24 and the rams 38 and 40. The pressure applying device is not shown as it is understood by those skilled in the art.

After the pressing operation, the pressing apparatus is turned off and allowed to cool slowly back to room temperature. The press bonded rotor assembly is allowed to cool simply by leaving it in the press. When the assembly is cooled, the removable graphite die elements are removed to take the now almost finished turbine rotor therefrom. In a finishing operation the encapsulant is removed from the blade ring which now has a hub hot pressed bonded thereto. As previously mentioned, the blade ring has been treated with the aforementioned release agent. Generally, the article is immersed in a bath to which ultrasonic energy is applied. The barrier material along the planes of association will loosen up and open up. Thereafter, the part may be machined to remove the pieces of encapsulant.

There has been dislcosed herein a method of protecting an article from cracking during its manufacture. In view of the teachings of this specification, those skilled in the art will be led to many modifications of the invention. It is intended that all modifications which fall within the spirit and scope of this invention by included within the appended claims.

I claim:

1. A method of protecting a ceramic body from cracking during a hot pressing operation in which pressure is applied to the body, the ceramic body having a portion thereof of complex shape defined by surfaces extending in different directions, the complex shaped portion of the body being supported by an encapsulating medium during the hot pressing operation, which method comprises the steps of:

applying a first layer of a release material to the surfaces of the ceramic body which are to be load reaction surfaces during the hot pressing operation, said release material being non-reactive with the ceramic body and encapsulating medium at the temperatures and pressures encountered in the hot pressing operation; and applying a second layer of said release material to the surfaces of the ceramic body which are not to be load reaction surfaces during the hot pressing operation wherein said first layer is of lesser thickness than said second layer.

2. The method of claim 1 wherein said relatively thin layer of release material has a thickness in a range of 0.001–0.003 inches and said relatively thick layer of release material has a thickness in the range from 0.005–0.010 inches in thickness.

3. A method of protecting a silicon nitride body from cracking during a hot pressing operation in which pressure is applied to the body, the silicon nitride body having a portion thereof of complex shape defined by surfaces extending in different directions, the complex shaped portion of the body being supported by an encapsulating medium during the hot pressing operation, which method comprises the steps of:

applying a first layer of boron nitride to the surfaces of the silicon nitride body which are to be load reaction surfaces during the hot pressing operation, said boron nitride being non-reactive with the silicon nitride body and encapsulating medium at the temperatures and pressures encountered in the hot pressing operation; and applying a second layer of said boron nitride to the surfaces of the silicon nitride body which are not to be loaded reaction surfaces during the hot pressing operation wherein said first layer is of lesser thickness than said second layer.

4. The method of claim 3 wherein said relatively thin layer of boron nitride has a thickness in the range of 0.001–0.003 inches and said relatively thick layer of said boron nitride has a thickness in the range of 0.005–0.010 inches in thickness.

* * * * *